(12) United States Patent
Liu et al.

(10) Patent No.: US 7,441,487 B2
(45) Date of Patent: Oct. 28, 2008

(54) TABLE SAW HAVING LOCKING MECHANISM FOR LOCKING TABLE EXTENSION THEREOF

(75) Inventors: Chia-Sheng Liu, Chiayi County (TW); Yu-Feng Chan, Kaohsiung County (TW)

(73) Assignee: Durq Machinery Corp., Taichung (TW)

( * ) Notice: Subject to any disclaimer, the term of this patent is extended or adjusted under 35 U.S.C. 154(b) by 329 days.

(21) Appl. No.: 11/182,744

(22) Filed: Jul. 18, 2005

(65) Prior Publication Data

US 2006/0266181 A1 Nov. 30, 2006

(51) Int. Cl.
*B23D 45/06* (2006.01)

(52) U.S. Cl. ............... 83/477.2; 83/477; 83/468.7; 83/438

(58) Field of Classification Search ............ 83/438, 83/441, 441.1, 477.2, 477, 698.11, 468.7, 83/446; 144/287, 286.5, 253.1; 269/318
See application file for complete search history.

(56) References Cited

U.S. PATENT DOCUMENTS

| | | | | |
|---|---|---|---|---|
| 2,771,103 A | * | 11/1956 | Odlum et al. | 83/438 |
| 2,806,493 A | * | 9/1957 | Gaskell | 83/438 |
| 6,293,176 B1 | * | 9/2001 | Talesky | 83/438 |
| 6,450,077 B1 | * | 9/2002 | Ceroll et al. | 83/468.7 |
| 6,484,614 B1 | * | 11/2002 | Huang | 83/438 |
| 6,647,847 B2 | * | 11/2003 | Hewitt et al. | 83/446 |
| 6,986,370 B1 | * | 1/2006 | Schoene et al. | 144/287 |
| 7,174,820 B2 | * | 2/2007 | Huang | 83/446 |

\* cited by examiner

*Primary Examiner*—Boyer D. Ashley
*Assistant Examiner*—Omar Flores-Sánchez
(74) *Attorney, Agent, or Firm*—Bacon & Thomas, PLLC

(57) ABSTRACT

A table saw includes two guide bars movable along two opposite sides of a worktable to carry a table extension, and a locking mechanism for locking the guide bars in position. The locking mechanism includes a handle pivoted to a coupling block at the bottom side of the worktable, two eccentric members reversely mounted in the handle, and two links respectively coupled between the eccentric members and the guide bars and movable with the handle to force a respective stop block against or to release the respective stop block from the guide bars to further lock or unlock the guide bars and the table extension.

6 Claims, 11 Drawing Sheets

TABLE SAW HAVING LOCKING MECHANISM FOR LOCKING TABLE EXTENSION THEREOF

BACKGROUND OF THE INVENTION

1. Field of the Invention

The present invention relates to a table saw and more particularly, to a table extension locking structure for table saw.

2. Description of the Related Art

A conventional table saw, as shown in FIGS. 1 and 2, comprises a worktable 1, two guide bars 2 and 2' respectively slidably coupled to two opposite lateral sides of the worktable 1 to carry a table extension (not shown), and a locking mechanism 3 provided at the bottom side of the worktable 1 for operation by the user to lock/unlock the guide bars 2 and 2'. According to this design, the locking mechanism 3 comprises a handle 4, a fixed guide block 5, a link 6, an adapter 7, and a stop member 8. The handle 4 has a beveled push face 4a formed in the back side and disposed in contact with a spiral guide face 5a of the fixed guide block 5, and a front side fixedly connected to one end of the link 6. The other end of the link 6 is coupled to the stop member 8 through the adapter 7. The stop member 8 is suspending inside one guide bar 2. FIGS. 1 and 2 show the stop member 8 not in contact with the inside wall of the guide bar 2. At this time, the guide bars 2 and 2' can be moved relative to the worktable 1. When the user turned the handle 4 to move the beveled push face 4a over the spiral guide face 5a of the fixed guide block 5, the stop member 8 is forced to displace and to further stop against the inside wall of the guide bar 2, thereby locking the guide bars 2 and 2' to the worktable 1.

The aforesaid locking mechanism 3 can be operated to lock/unlock the guide bars 2 and 2'. However, the handle 4 tends to be forced away from the locking position to release the stop member 8 from the guide bar 2 accidentally by an external force, thus the working safety is not ensured Therefore, it is desirable to provide a table extension locking structure for table saw that eliminates the aforesaid problem.

SUMMARY OF THE INVENTION

The present invention has been accomplished under the circumstances in view. It is one object of the present invention to provide a table extension locking structure for table saw, which provides a positive locking force to lock the table extension of the table saw.

To achieve this object of the present invention, the table saw comprises a worktable; at least one rail provided at the worktable; a coupling block fixedly provided at a bottom side of the worktable; at least one guide bar coupled to the at least one rail and movable along the at least one rail relative to the worktable; and a locking mechanism for locking the at least one guide bar to the at least one rail. The locking mechanism comprises a pivot pin fastened to the coupling block, and a handle coupled to the pivot pin and turnable about the pivot pin between a locking position where the locking mechanism locks the at least one guide bar to the at least one rail and an unlocking position where the at least one guide bar is unlocked from the at least one rail. The handle has a grip at a rear end thereof for the holding of the hand. At least one eccentric member having an actuating edge is mounted in the handle. At least one link has a hook disposed at one end thereof and fitting the actuating edge of each of the at least one eccentric member respectively and a stop portion disposed at an opposite end thereof for stopping against the at least one rail. The stop portion is forced against the at least one rail when the handle is moved to the locking position, and the stop portion is disengaged from the at least one rail when the handle is moved to the unlocking mechanism.

DETAILED DESCRIPTION OF THE INVENTION

Figure 1:
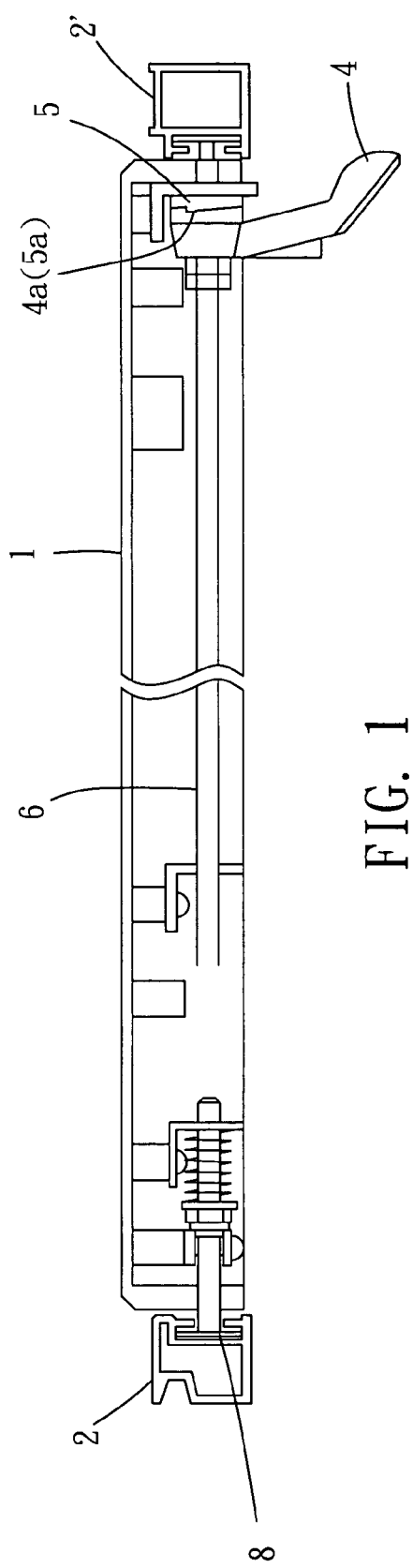
FIG. 1 is a sectional assembly view of a table saw according to the prior art.
Figure 2:
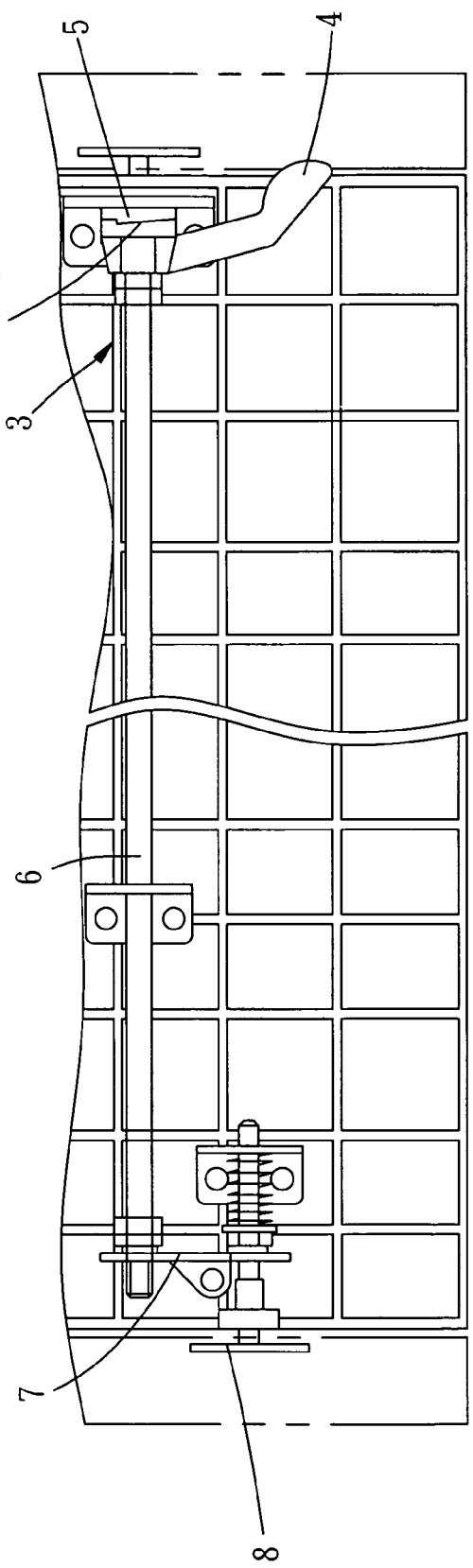
FIG. 2 is a schematic bottom view of the prior art table saw.
Figure 3:
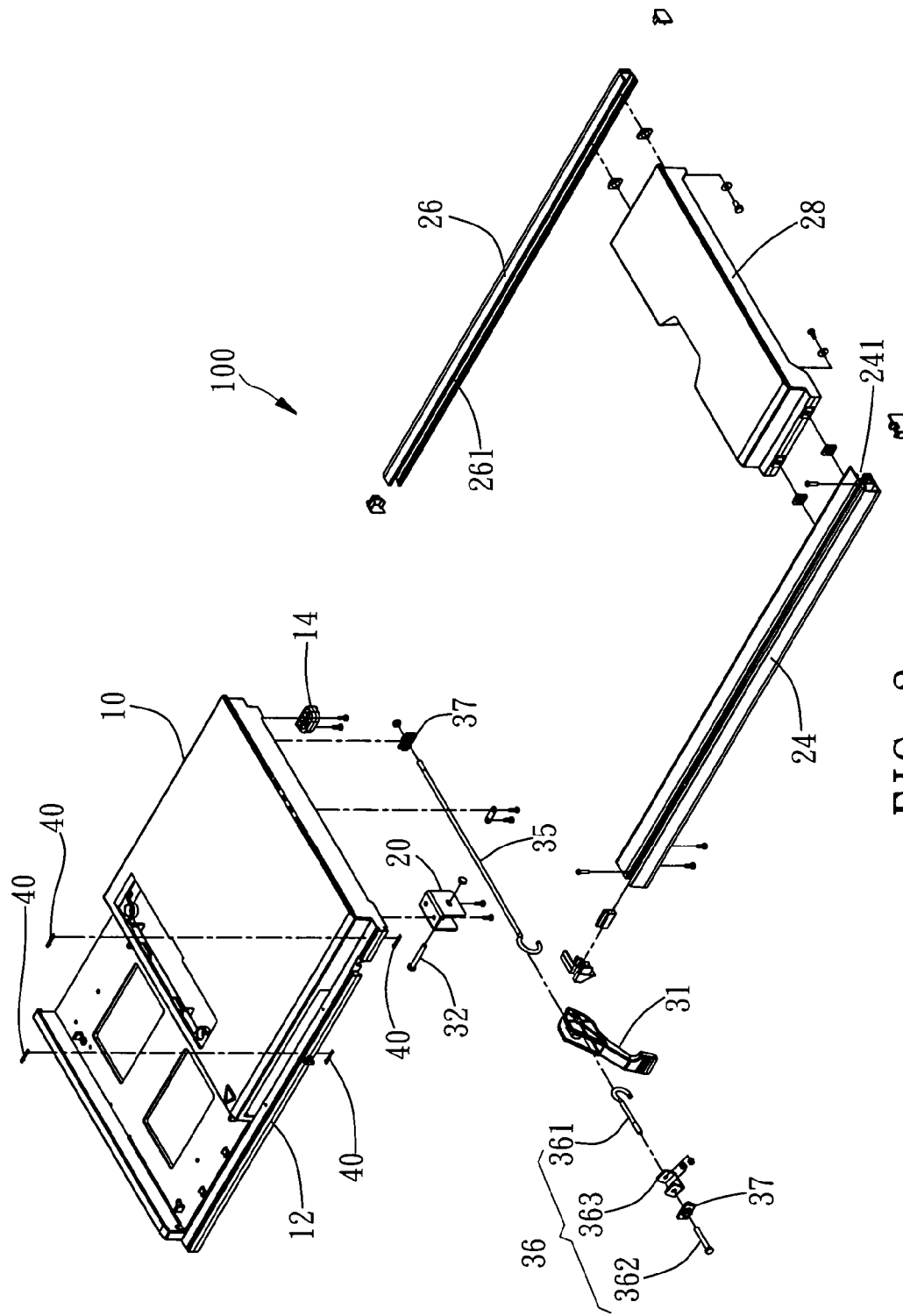
FIG. 3 is an exploded view of a table saw according to the present invention.
Figure 4:
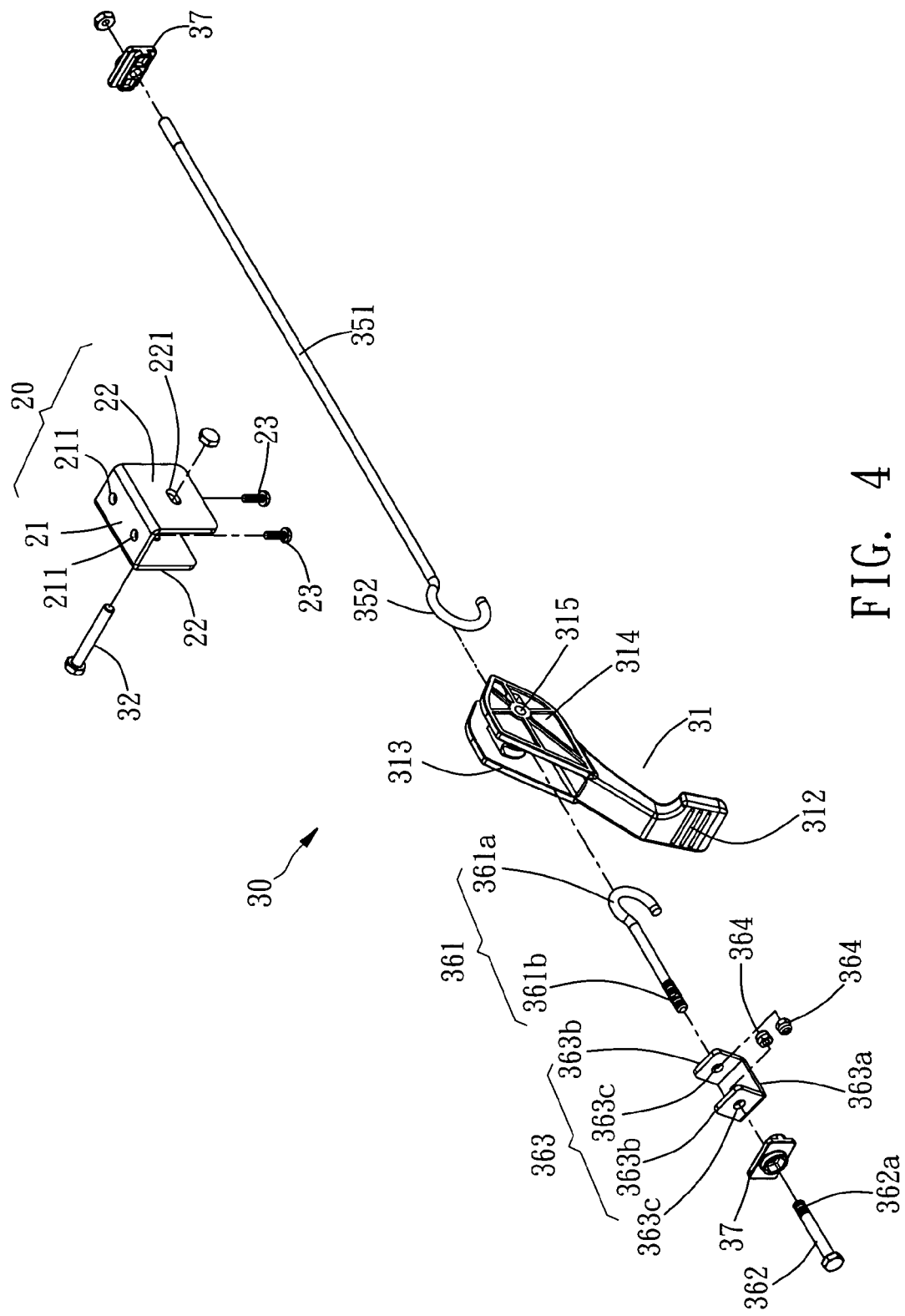
FIG. 4 is an exploded view of the locking mechanism according to the present invention.
Figure 5:
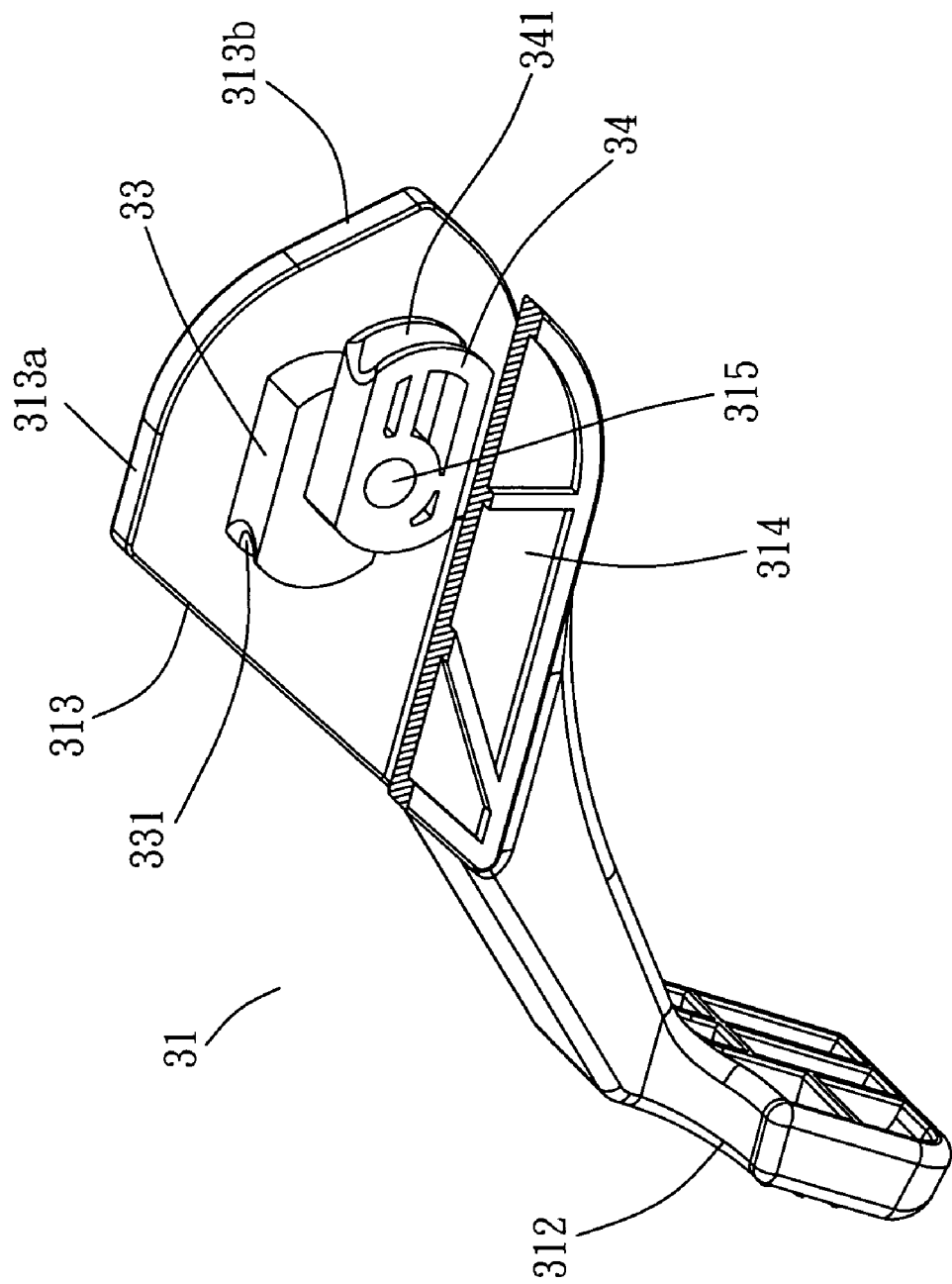
FIG. 5 is a perspective view in an enlarged scale of a part of the locking mechanism, showing the structure of the handle and the relative positioning of the two eccentric members in the handle.
Figure 6:
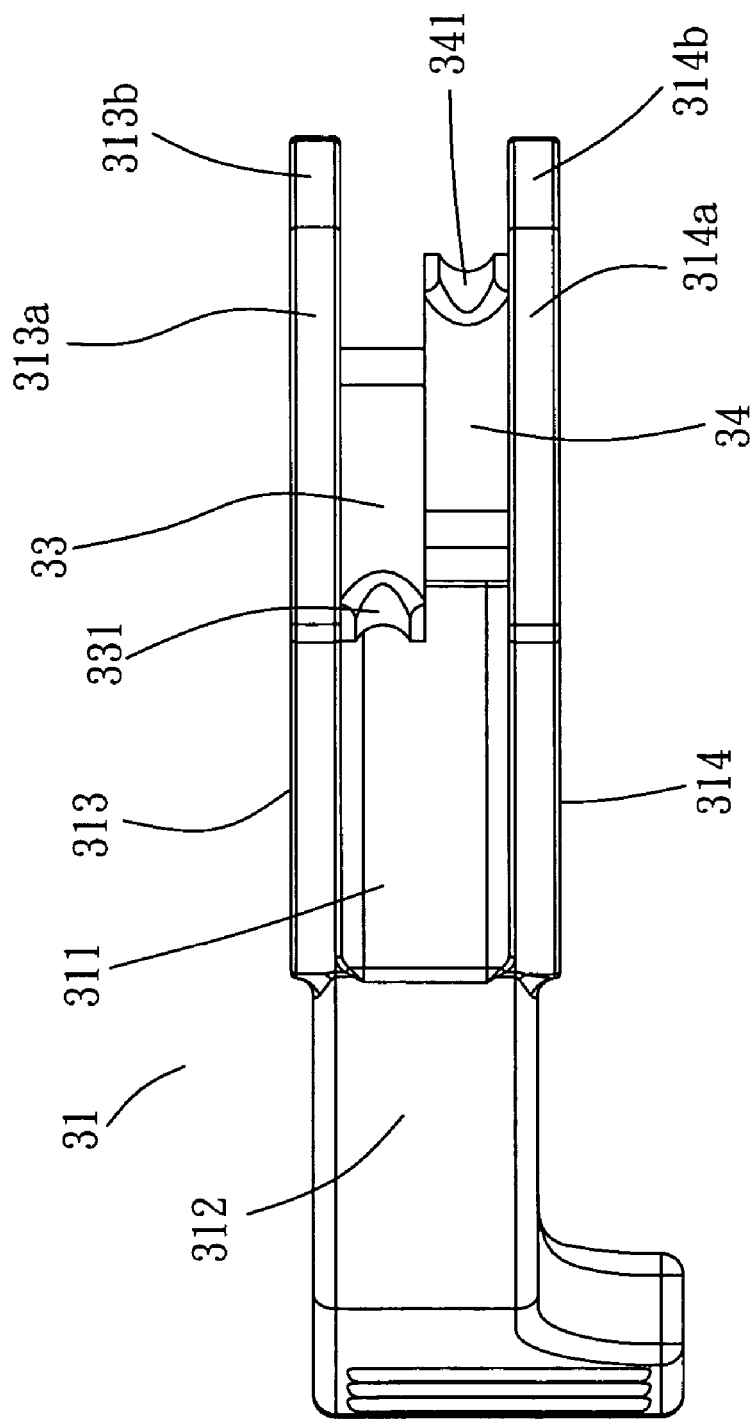
FIG. 6 is a top plain view of FIG. 5.

Referring to FIGS. 3-6, a table saw 100 in accordance with the present invention is shown comprised of a worktable 10, a first rail 12, a second rail 14, a coupling block 20, a first guide bar 24, a second guide bar 26, a table extension 28, and a clamping mechanism 30.

The worktable 10 is a flat rectangular table. The first rail 12 is formed integral with one long side, namely, the first long side of the worktable 10. The second rail 14 is formed of a plurality of guide blocks longitudinally arranged in line at the other long side, namely, the second long side of the worktable 10. Alternatively, the second rail 14 can be a long bar formed integral with the second long side of the worktable 10. Further, a mounting block 16 is formed integral with the bottom wall of the worktable 10 adjacent to the first rail 12 (see also FIG. 7).

The coupling block 20 is a frame member having a top wall 21 and two parallel sidewalls 22. The top wall 21 has two through holes 211. The sidewalls 22 each have a locating hole 221. Two screws 23 are respectively mounted in the through holes 211 and threaded into the mounting block 16 to affix the coupling block 20 to the bottom side of the worktable 10.

The first guide bar 24 and the second guide bar 26 are straight bars, each having a longitudinal sliding groove 241 or 261 extending through the respective two distal ends. The first guide bar 24 is coupled to the first rail 12. The second guide bar 26 is coupled to the second rail 14. The table extension 28 is connected between the distal ends of the guide bars 24 and 26. When the user pulls the table extension 28, the guide bars 24 and 26 are moved with the table extension 28 along the rails 12 and 14. Further, friction-resistant pads 40 are provided between the first guide bar 24 and the first rail 12 to reduce friction resistance.

The clamping mechanism 30 comprises a handle 31, a pivot pin 32, a first eccentric member 33, a second eccentric member 34, a first link 35, a second link 36, and two stop blocks 37.

The handle 31 comprises a front base 311, a rear grip 312 backwardly extending from the front base 311, two front sidewalls 313 and 314 respectively upwardly extending from the front side of the front base 311 and substantially arranged in parallel, and a through hole 315 cut through the front sidewalls 313 and 314. The front sidewalls 313 and 314 each have a first stop edge 313a or 314a, and a second stop edge 313b or 314b extending from one end of the first stop edge 313a or 314a.

The pivot pin 32 is fastened to the locating holes 221 and the through hole 315 to pivotally secure the handle 31 to the coupling block 20, allowing the handle 31 to be turned about the pivot pin 32 between the locking position P1 where the first stop edges 313a and 314a are stopped against the top wall 21 of the coupling block 20 (see FIG. 7), and the unlocking position P2 where the second stop edges 313b and 314b are stopped against the top wall 21 of the coupling block 20.

Figure 8:
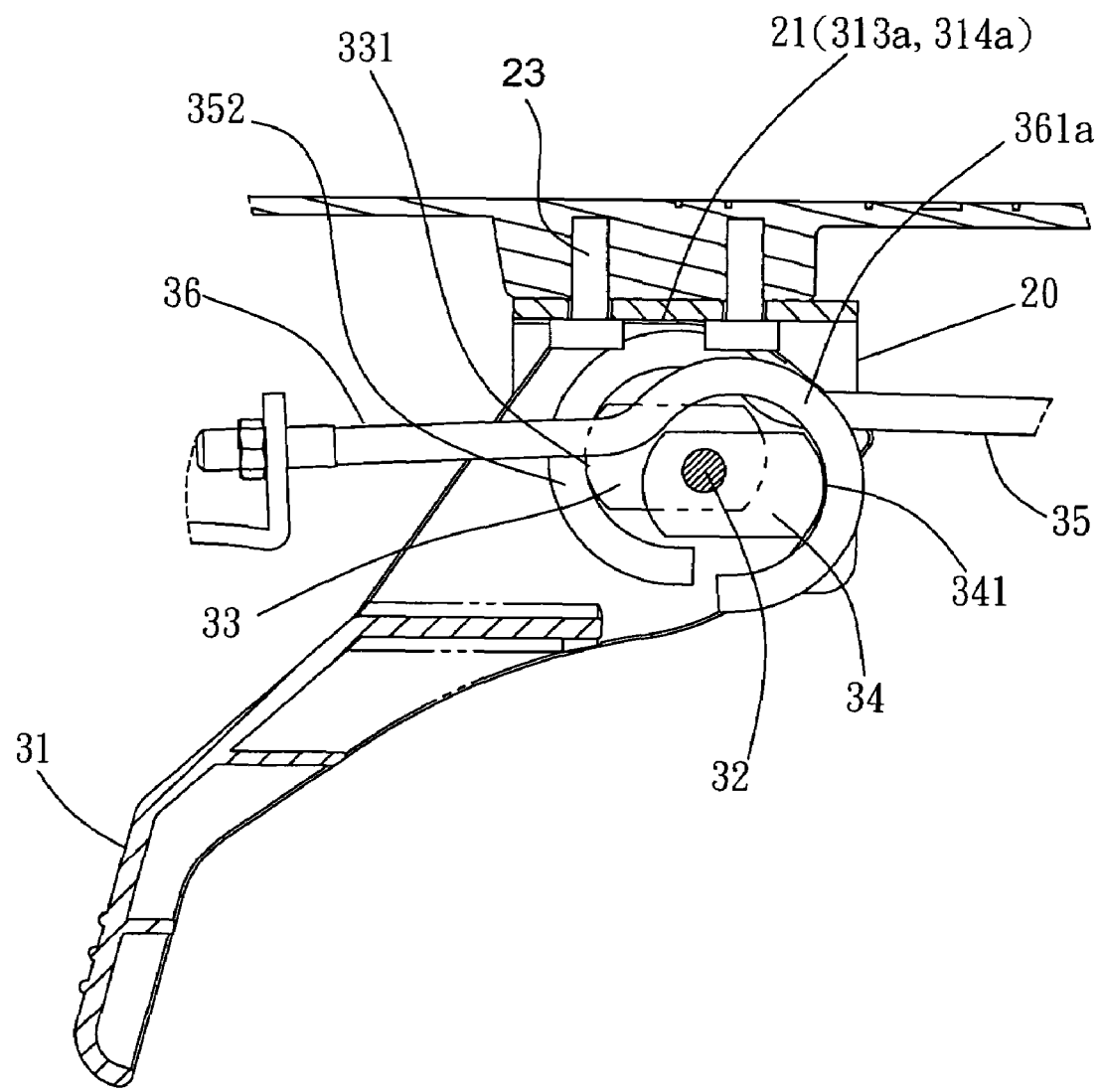
FIG. 8 is an enlarged view of a part of FIG. 7.

The first eccentric member 33 is fastened to the inner side of one front sidewall 313, having an arched and slightly recessed actuating edge 331. The second eccentric member 34 is fastened to the inner side of the other front sidewall 314, having an arched and slightly recessed actuating edge 341. As shown in FIG. 8, the first eccentric member 33 and the second eccentric member 34 are turnable with the handle 31 about the pivot pin 32. The actuating edges 331 and 341 are disposed at two opposite sides remote from the pivot pin 32.

Figure 9:
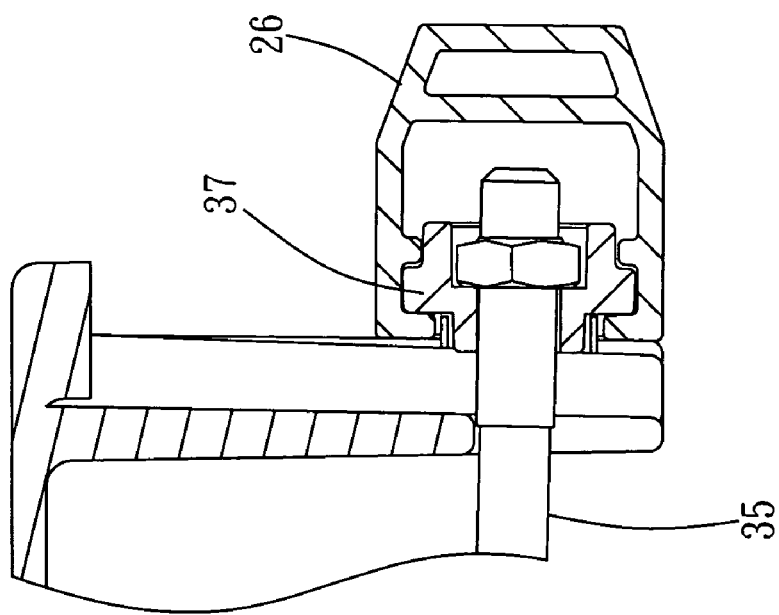
FIG. 9 is an enlarged view of another part of FIG. 7.
Figure 9:
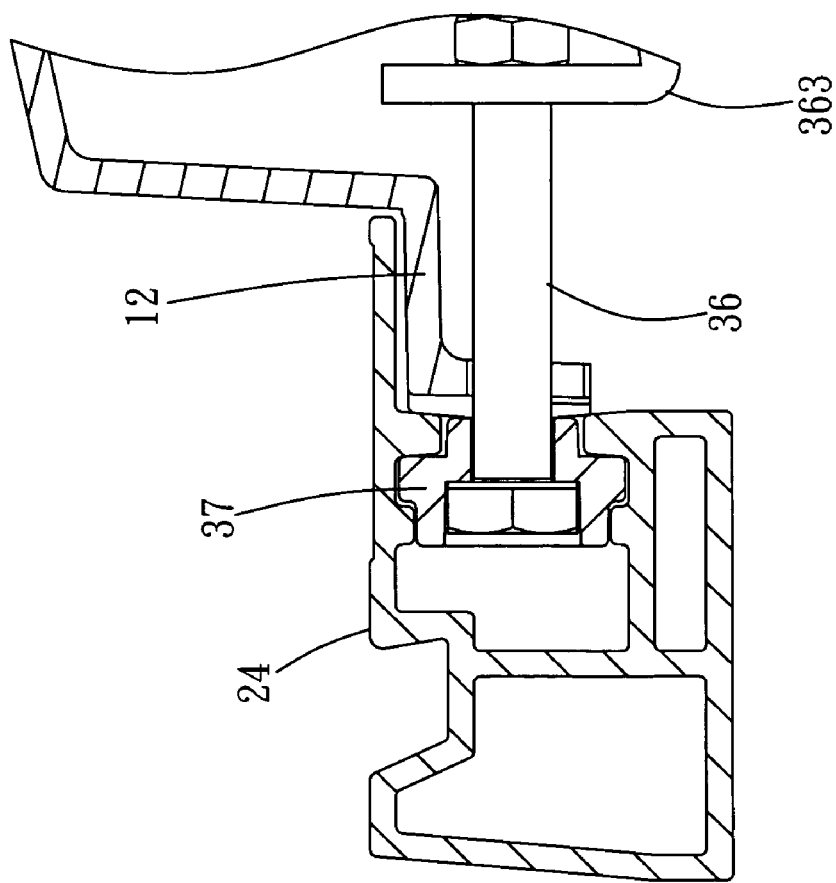

The first link 35 has an elongated shank 351, and a hook 352 formed integral with one end of the elongated shank 351 to fit the actuating edge 331. As shown in FIG. 9, one end (the end without the hook 352) of the shank 351 of the first link 35 is perpendicularly inserted through the second guide bar 26 across the longitudinal sliding groove 261 and then mounted with one stop block 37, forming a first stop portion. According to this embodiment, the stop block 37 is fastened to the shank 351 through a screw joint.

The second link 36 is comprised of a first rod member 361, a second rod member 362, a connecting member 363, and two nuts 364. The first rod member 361 has a hook 361a at one end and a screw tip 361b at the other end. The hook 361a is adapted to fit the actuating edge 341. The second rod member 362 is a headed screw bolt perpendicularly inserted through the first guide bar 24 across the longitudinal sliding groove 241 and then mounted with the other stop block 37, forming a second stop portion (see FIG. 9). Further, the second rod member 362 has a threaded tip 362a. The connecting member 363 comprises a horizontal panel 363a and two vertical panels 363b arranged in parallel at two sides of the horizontal panel 363a. The vertical panels 363b each have a through hole 363c for the passing of the threaded tip 361b of the first rod member 361 and the threaded tip 362a of the second rod member 362 respectively. The two nuts 364 are respectively threaded onto the threaded tip 361b of the first rod member 361 and the threaded tip 362a of the second rod member 362 and stopped inside the connecting member 363 to secure the first rod member 361 and the second rod member 362 to the connecting member 363. By means of rotating the nuts 364 relative to the threaded tips 361b of the first rod member 361 and the threaded tip 362a of the second rod member 362 respectively, the total length of the second link 36 is adjusted.

After understanding of the component parts of the table saw 100 and their relative positioning, the operation of the locking mechanism 30 is described hereinafter.

Figure 7:
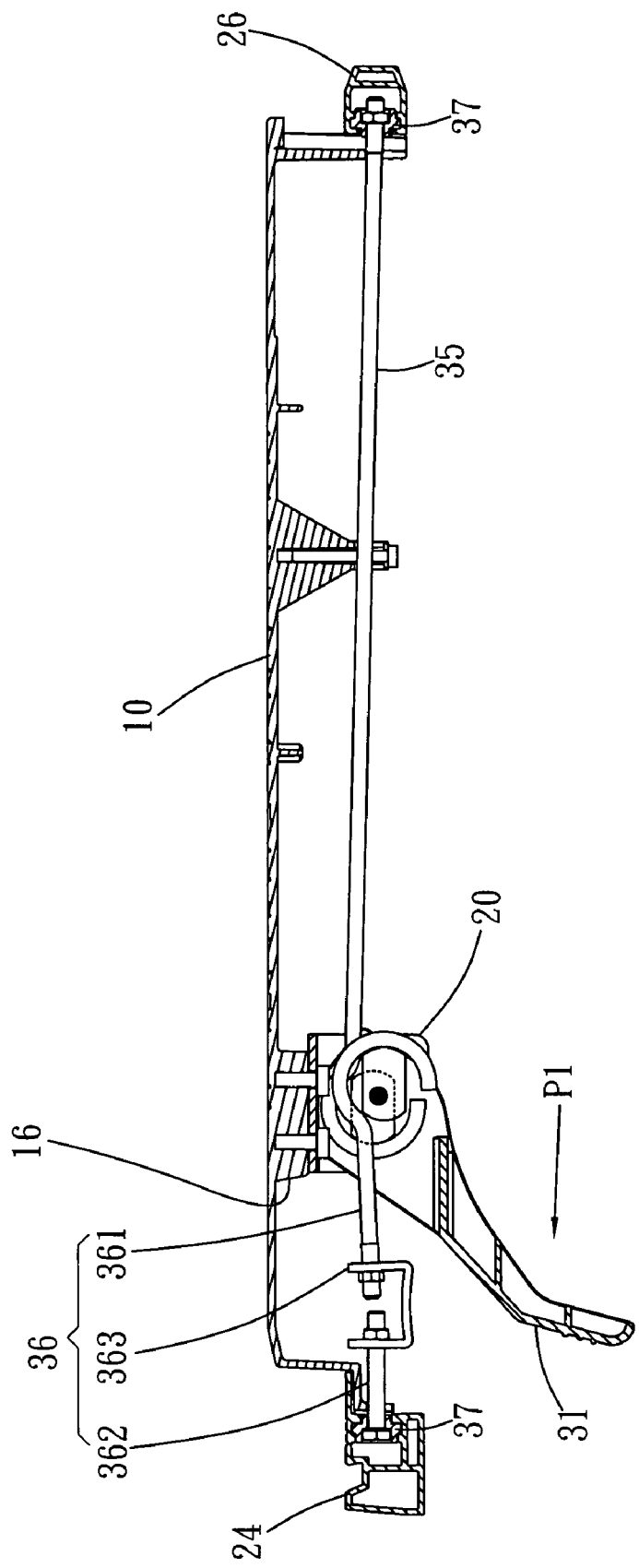
FIG. 7 is a sectional assembly view of the present invention, showing the locking status of the locking mechanism.

FIGS. 7 and 8 show the locking status of the locking mechanism 30 where the first guide bar 24 and the first rail 26 are locked. At this time, the first stop edges 313a and 314a of the front sidewalls 313 and 31 are stopped against the top wall 21 of the coupling block 20 (see FIG. 7), holding the mechanism in the locking position P1; the first link 35 and the second link 36 are respectively constrained by the first eccentric member 33 and the second eccentric member 34 to force the stop blocks 37 against the inner side of the first guide bar 24 and the inner side of the second guide bar 26 (see FIG. 9), and therefore the first guide bar 24 and the first rail 26 are locked, i.e., the table extension 28 is locked.

Figure 10:
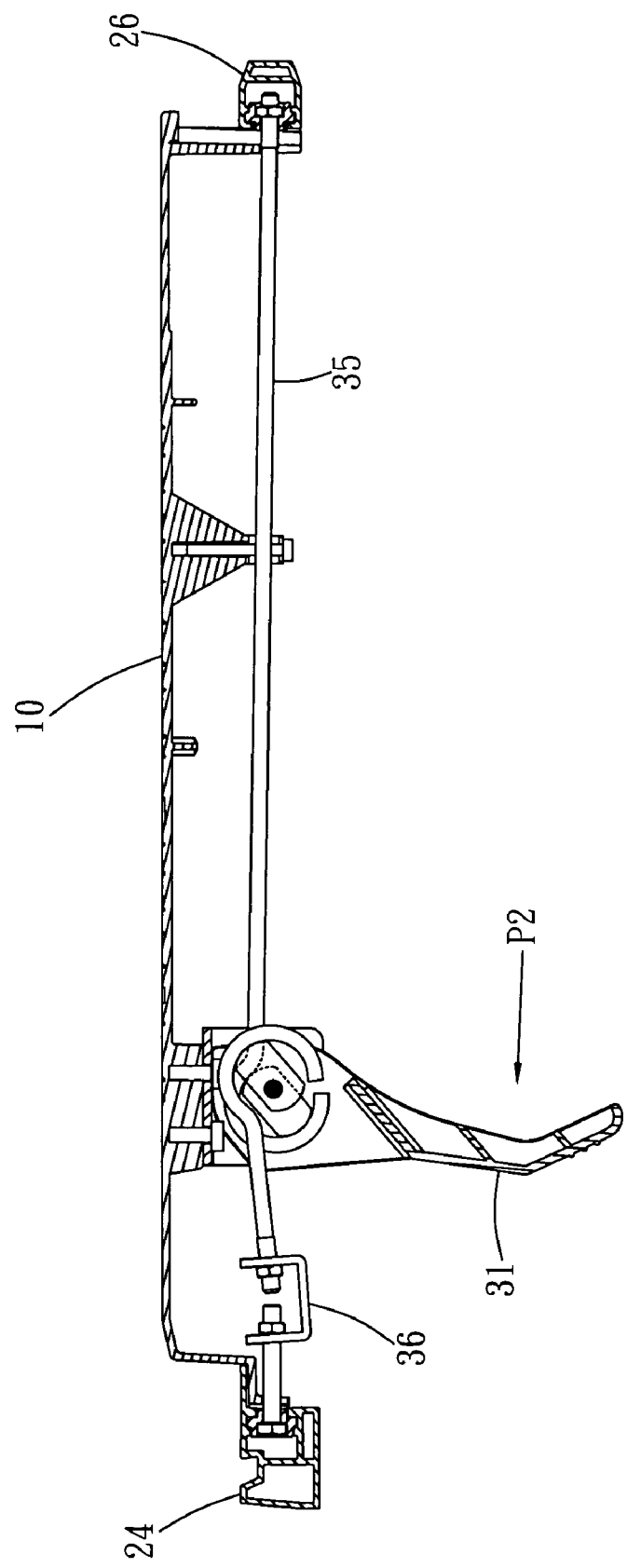
FIG. 10 is similar to FIG. 7 but showing the unlocking status of the locking mechanism.
Figure 11:
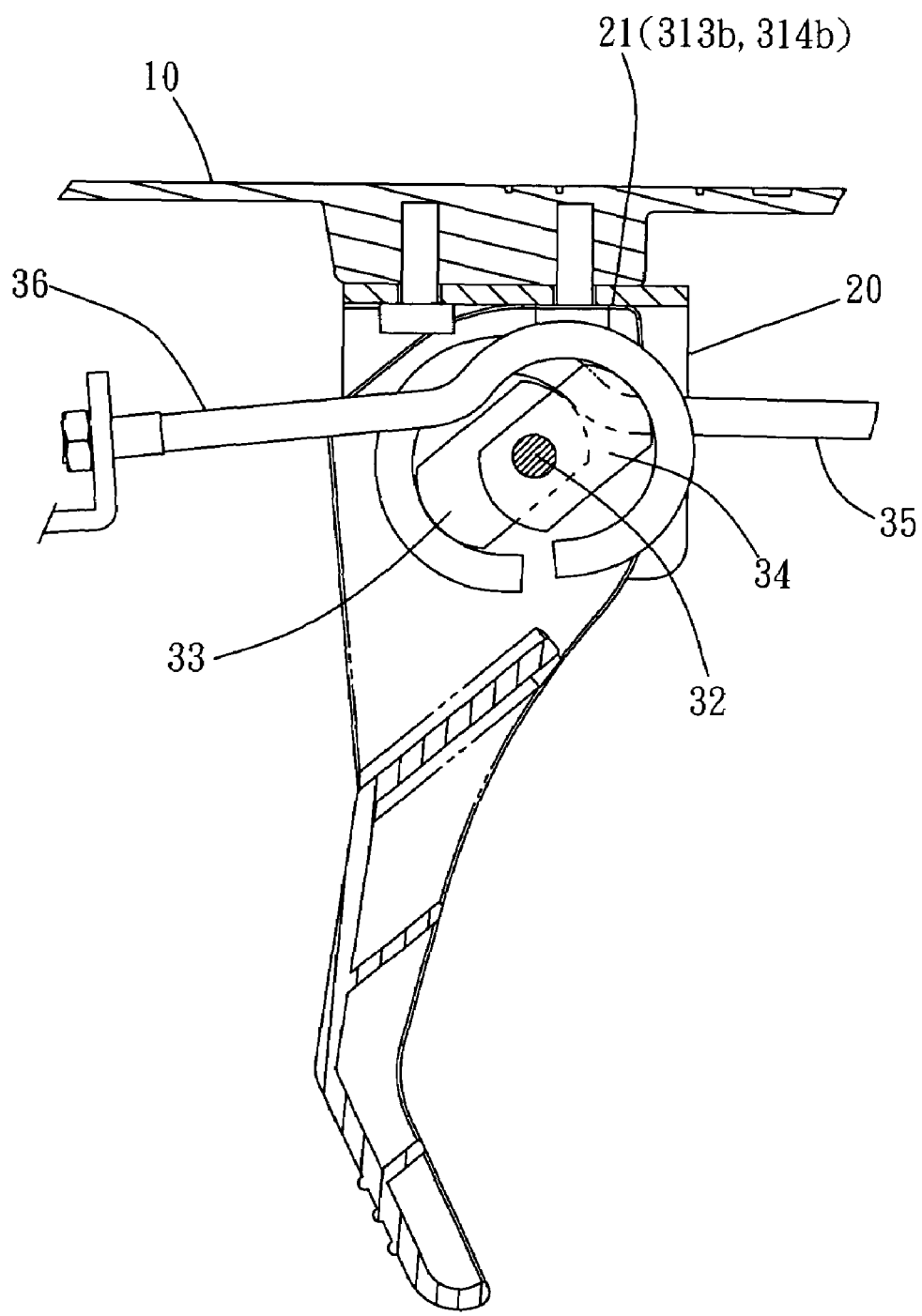
FIG. 11 is an enlarged view of a part of FIG. 10.
Figure 12:
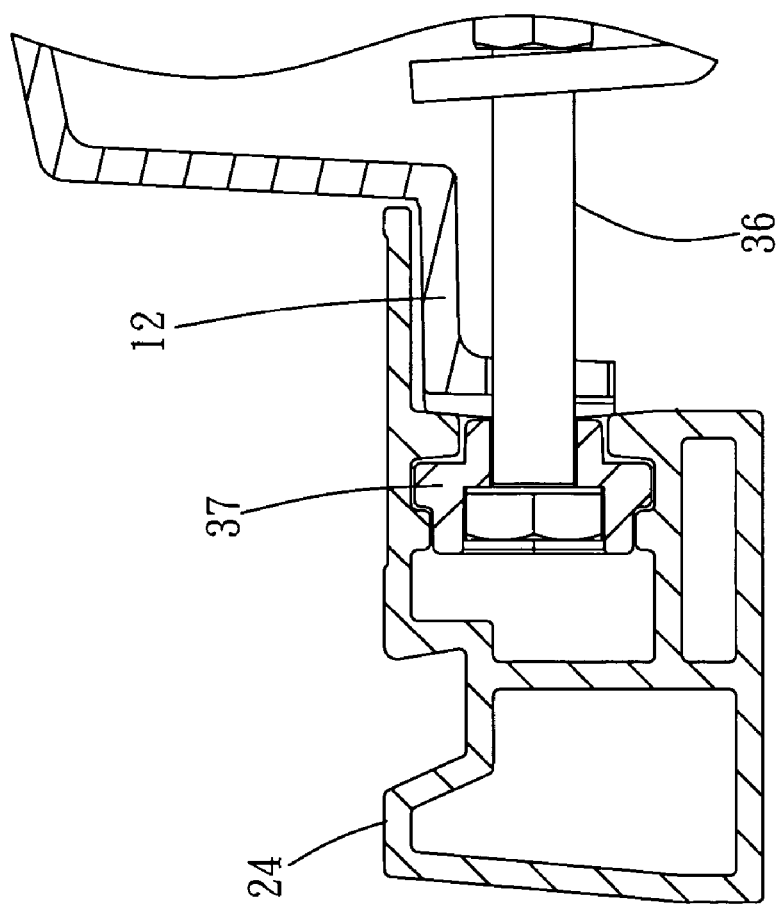
FIG. 12 is an enlarged view of another part of FIG. 10.

Referring to FIGS. 10-12, when the user turns the handle 31 downwards to move the second stop edges 313b and 314b into contact with the top wall 21 of the coupling block 20, the mechanism is stopped in the unlocking position P2. Because the first eccentric member 33 and the second eccentric member 34 are moved with the handle 31, the relative position between the actuating edges 331 and 341 is changed at this time. This relative position change releases the first link 35 and the second link 36 from the constraint of the first eccentric member 33 and the second eccentric member 34, i.e., the stop blocks 37 are disengaged from the first guide bar 24 and the second guide bar 26, allowing the user to move the table extension 28 to the desired position.

As indicated above, the locking mechanism 30 has a simple structure and is inexpensive to manufacture. Further, the handle 31 can be turned to move the locking mechanism 30 between the locking position and the unlocking position and to have the locking mechanism 30 be positively positioned in the locking position or unlocking position, preventing a false action of the mechanism.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A table saw comprising:
a worktable;
at least one rail provided at said worktable;
a coupling block fixedly provided at a bottom side of said worktable;
at least one guide bar coupled to said at least one rail and movable along said at least one rail relative to said worktable; and
a locking mechanism for locking said at least one guide bar to said at least one rail, said locking mechanism comprising a pivot pin fastened to said coupling block, a handle coupled to said pivot pin and turnable about said pivot pin between a locking position where said locking mechanism locks said at least one guide bar to said at least one rail and an unlocking position where said at least one guide bar is unlocked from said at least one rail, said handle having a grip at a rear end thereof for the holding of the hand, at least one eccentric member mounted in said handle and having an actuating edge, and at least one link having a hook disposed at one end thereof and fitting the actuating edge of said at least one eccentric member and a stop portion disposed at an opposite end thereof for stopping against said at least one rail, said stop portion being forced against said at least one rail when said handle is moved to said locking position, said stop portion being disengaged from said at least one rail when said handle is moved to said unlocking mechanism;
wherein said at least one rail includes a first rail and a second rail respectively fixedly provided at two opposite sides of said worktable; said at least one guide bar includes a first guide bar coupled to said first rail and a second guide bar coupled to said second rail; said at least one eccentric member of said locking mechanism includes a first eccentric member and a second eccentric member reversely mounted in said handle, said first eccentric member and said second eccentric member each having a respective actuating edge; said at least one link includes a first link and a second link, said first link having first end terminating in a hook to fit the actuating edge of said first eccentric member and a second end coupled to said fist guide bar, said second link having a first end terminating in a hook to fit the actuating edge of said second eccentric member and a second end coupled to said second guide bar.

2. The table saw as claimed in claim 1, wherein said coupling block comprises a top wall, two parallel sidewalls having respectively a locating hole; said handle comprises a front base, two front sidewalls respectively upwardly extending from a front side of said front base and substantially arranged in parallel, and a through hole cut through said front sidewalls; said pivot pin is inserted through the through hole of said handle and fastened to the locating holes of said coupling block to pivotally secure said handle to said coupling block; said first eccentric member and said second eccentric member are respectively fastened to the two front sidewalls of said handle in reversed directions.

3. The table saw as claimed in claim 2, wherein said first guide bar and said second guide bar each having a longitudinal sliding groove respectively coupled to said first rail and said second rail; said first link and said second link are respectively perpendicularly inserted through said first guide bar and said second guide bar across the longitudinal sliding groove of the respective guide bar and fixedly mounted with a respective stop block to form the respective stop portion, the stop blocks of said first link and said second link being respectively stopped against said first guide bar and said second guide bar when said handle is moved to said locking position.

4. The table saw as claimed in claim 2, wherein said front sidewalls of said handle each have a first stop edge and a second stop edge, said first stop edge being forced into contact with the top wall of said coupling block when said handle is moved to said locking position, said second stop edge being forced into contact with the top wall of said coupling block when said handle is moved to said unlocking position.

5. The table saw as claimed in claim 1, wherein said second link is comprised of a first rod member, a connecting member, and a second rod member, said first rod member having a first end forming the hook of said second link and a second end connected to said connecting member, said second rod member having a first end forming the stop portion of said second link and a second end connected to said connecting member.

6. The table saw as claimed in claim 5, wherein said connecting member comprises a horizontal panel and two vertical panels arranged in parallel at two sides of said horizontal panel, said vertical panels each having a through hole; the second ends of said first link and said second link each have a threaded tip respectively inserted through the through holes of the vertical panels of said connecting member and mounted with a respective nut.

* * * * *